United States Patent
Burnley et al.

(10) Patent No.: US 7,357,094 B2
(45) Date of Patent: Apr. 15, 2008

(54) BIMINI TOP SUPPORT FRAME WITH FLUSH MOUNT FITTING

(76) Inventors: Michael Burnley, 108 Inagehi Way, Loudon, TN (US) 37774-6846; Samuel Dwello, 50 NE. 179th St., Miami, FL (US) 33162

( * ) Notice: Subject to any disclaimer, the term of this patent is extended or adjusted under 35 U.S.C. 154(b) by 15 days.

(21) Appl. No.: 11/383,538

(22) Filed: May 16, 2006

(65) Prior Publication Data

US 2006/0278801 A1 Dec. 14, 2006

Related U.S. Application Data

(60) Provisional application No. 60/682,785, filed on May 19, 2005.

(51) Int. Cl.
*B63B 17/00* (2006.01)

(52) U.S. Cl. .................................................. 114/361

(58) Field of Classification Search ................ 114/255, 114/343, 361, 364
See application file for complete search history.

(56) References Cited

U.S. PATENT DOCUMENTS

| | | | |
|---|---|---|---|
| 4,132,488 A * | 1/1979 | Strong ........................ | 114/361 |
| 4,858,802 A * | 8/1989 | Hamby et al. .............. | 114/364 |
| 7,025,015 B2 * | 4/2006 | Wilcox et al. .............. | 114/255 |
| 7,093,558 B1 * | 8/2006 | Mandanici ................... | 114/361 |

* cited by examiner

*Primary Examiner*—Lars A. Olson
(74) *Attorney, Agent, or Firm*—Robert M. Schwartz; Alfred K. Dassler

(57) ABSTRACT

A support frame mounts to a surface and for receives a support tube having a locking button. The support frame includes a cap for affixing the support frame to the surface. A sleeve is attached to the cap for receiving the support tube and for engaging the locking button. A filler sleeve is disposed in the sleeve for abutting an end of the support tube. A spring is disposed in the sleeve for biasing the filler sleeve against the support tube. The filler sleeve has a stop for limiting the travel of the filler sleeve and for retaining the filler sleeve in the sleeve.

13 Claims, 3 Drawing Sheets

BIMINI TOP SUPPORT FRAME WITH FLUSH MOUNT FITTING

CROSS-REFERENCE TO RELATED APPLICATIONS

This application claims the benefit of U.S. Provisional Application Ser. No. 60/682,785, filed on May 19, 2005, entitled Bimini Top Support Frame With Flush Mount Filling; and the benefit of U.S. Provisional Application Ser. No. 60/695,474, filed on Jun. 30, 2005, entitled spring loaded retainer; the prior applications are herewith incorporated by reference in their entirety.

BACKGROUND OF THE INVENTION

1. Field of the Invention

The present invention pertains to a support frame or spring loaded retainer that is used to mount a folding canopy or roof with support posts/tubes on a boat/marine vessel. More specifically, to a bimini top support frame that is mounted to a surface of a boat such as a gunwale.

2. Description of the Related Art

Bimini tops are usually mounted on surfaces of a boat using deck hinge with a fitting, which mounts to an end of a support tube having a ball end.

The deck hinge is disposed on the surface and sticks up above the surface. Deck hinges include mounting holes for attachment to a surface, such as the gunwale. Deck hinges have pocket or cavity for receiving the end of the support tube. Deck hinges are typically made of stainless steel. Support straps may be further used to help further secure the support tube.

The disadvantages of the deck hinge as described above are that the support pole is subject to vibration. This can lead to excess noise created by the vibration. Also, the installation of the support tube is time consuming because of the need to attach multiple parts (support tube to hinge and straps to further support the support tube). Moreover, the deck hinge sticks-up and is a trip hazard or a stubbing hazard.

SUMMARY OF THE INVENTION

It is accordingly an object of the invention to provide a support frame which overcomes the above-mentioned disadvantages of the heretofore-known devices of this general type and which provides a support frame that is more versatile and easier to use.

With the foregoing and other objects in view there is provided, a support frame mounts to a surface and for receives a support tube having a locking button. The support frame includes a cap for affixing the support frame to the surface. A sleeve is attached to the cap for receiving the support tube and for engaging the locking button. A filler sleeve is disposed in the sleeve for abutting an end of the support tube. A spring is disposed in the sleeve for biasing the filler sleeve against the support tube. The filler sleeve has a stop for limiting the travel of the filler sleeve and for retaining the filler sleeve in the sleeve.

In accordance with another feature of the invention, the stop is configured as a plug connected to the filler sleeve with a pin. The pin engages the sleeve.

In accordance with an added feature of the invention, the sleeve has longitudinal slots for engaging the pin.

In accordance with an additional feature of the invention, the filler sleeve has a top surface and the cap has a top surface. The longitudinal slots and the pin are configured to limit travel of the filler sleeve such that the top surfaces are flush with one another.

In accordance with yet an additional feature of the invention, the cap includes a tube portion which overlaps the sleeve to attach the sleeve to the cap.

In accordance with a further feature of the invention, the tube portion has at least one opening formed therein for engaging the locking button.

In accordance with yet another feature of the invention, the cap has holes formed therein for mounting the support frame to the surface.

In accordance with another mode of the invention, there is provided a support assembly for supporting a bimini top on a marine vessel. The assembly includes a support tube having a locking button and an actuator button for actuating the locking button. A support frame mounts to a surface of the vessel. The support frame includes a cap for affixing the support frame to the surface. The support frame has a sleeve attached to the cap for receiving the support tube, for engaging the locking button, and for receiving the support tube. A biased filler sleeve is disposed in the sleeve for abutting the support tube. The filler sleeve is retained in sleeve.

In accordance with still another feature of the invention, the biased filler sleeve is biased against the support tube by a spring.

In accordance with yet a further feature of the invention, the biased filler sleeve has a stop for limiting the travel of the biased filler sleeve and for retaining the biased filler sleeve in the sleeve.

In accordance with yet an added feature of the invention, the sleeve has openings formed therein for engaging the locking pin Other features which are considered as characteristic for the invention are set forth in the appended claims.

Although the invention is illustrated and described herein as embodied as a support frame for holding a support tube of a bimini top, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
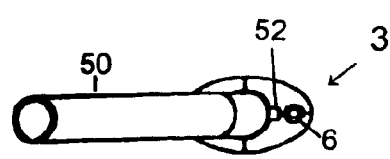
FIG. 1 is a plan view of the support frame according to the invention with a support tube in place.
Figure 2:
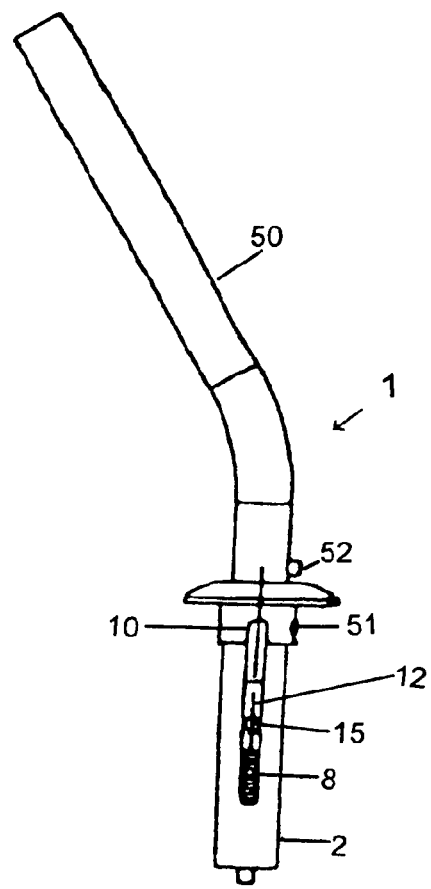
FIG. 2 is a side elevational view of the support frame according to the invention showing support post in place.
Figure 3:
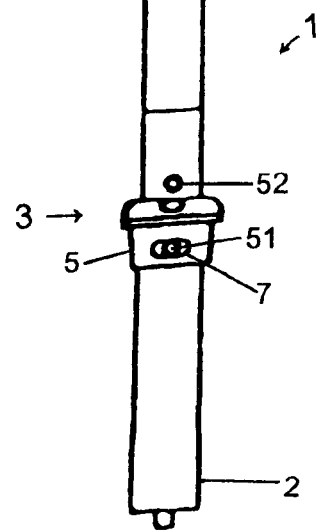
FIG. 3 is a further side elevational view of the support frame according to the invention with the support tube in place.
Figure 4:
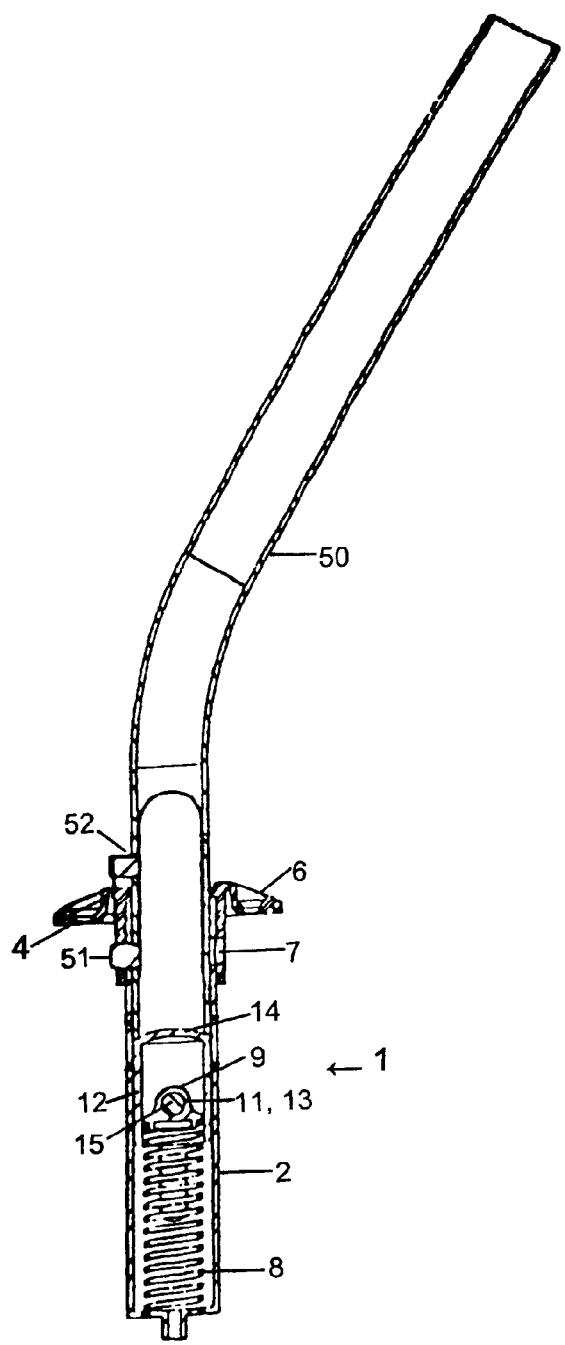
FIG. 4 is a sectional view along line B-B of the support frame according to the invention with the support tube in place.
Figure 5:
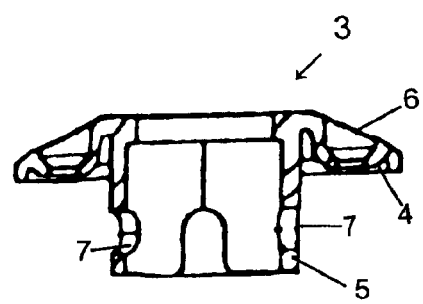
FIG. 5 is a partial sectional view along line B-B of the support frame according to the invention without the support tube in place.
Figure 6:
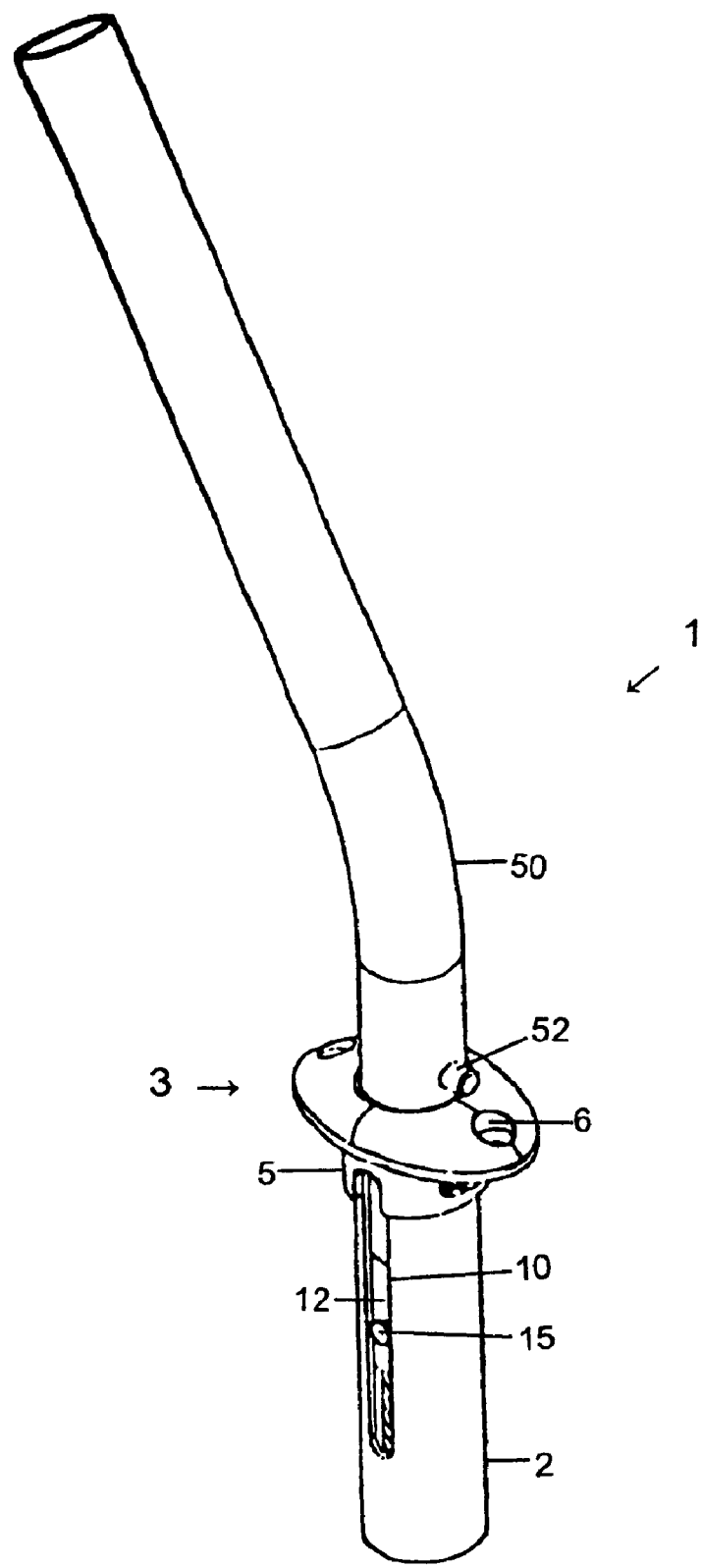
FIG. 6 is a perspective view according to the invention with the support tube in place.

Referring now to the figures of the drawing in detail and first, particularly, to FIGS. 2 and 4, which illustrate the support frame or spring loaded retainer 1 with the support tube 50 in place. The support frame 1 has a sleeve 2, which receives the support tube 50. The sleeve 2 is attached to a cap or mounting plate 3 that mounts to a mounting surface. The cap 3 has a shoulder 4 that abuts the mounting surface and a tube portion 5 that projects below the mounting surface and which connects the cap 3 to the sleeve 2. The cap 3 also has mounting holes 6 formed therein for accepting fasteners for affixing the support frame 1 to the mounting surface. While the Figures show that the tube portion 5 is substantially orthogonal to the shoulder 4 it is possible for the tube portion 5 to be at an acute angle with respect to the shoulder 4. This would accommodate a support tube 50 that is not orthogonal to the mounting surface.

The tube portion 5 includes openings 7, which are provided to engage a locking button 51 of the support tube 50 when the support tube 50 is disposed in the support frame 1. If the sleeve 2 overlaps the tube portion 5 beyond the location of the openings 7, the sleeve 2 may also include the openings 7 of the tube portion 5. An actuator button 52 which retracts the locking button 51 is disposed above the cap 3 when the support tube 50 is disposed in the support frame 1. The sleeve 2 has longitudinal slots 10 formed therein. The longitudinal slots 10 are disposed 180° apart from one another and may extend into the tube portion 5. The longitudinal slots 10 may be disposed between the openings 7 on the circumference of the sleeve 2 and the tube portion 5.

A spring 8 is disposed inside the sleeve 2 and abuts a bottom surface of the sleeve 2. A plug or spring stop 9 is mounted on the spring 8. The plug 9 may engage the outside or inside diameter of the spring 8 for holding the plug 9 on the spring. The plug 9 has a transverse hole 11 formed therein. The transverse hole 11 is perpendicular to a longitudinal axis of the sleeve 2.

A filler sleeve or pressure sleeve 12 is disposed inside the sleeve 2 and has transverse holes 13 formed therein. The transverse holes 13 are disposed 180° apart. The filler sleeve 12 also has a smooth top 14, which is level with the top of the cap 3 when the support tube 50 is not disposed in the support frame 1. The filler sleeve 12 is fixed to the plug 9 by a pin 15, which is inserted into the transverse holes 13 and into the transverse hole 11 of the plug 9. The pin 15 projects out of the filler sleeve 12 and into the longitudinal slots 10. The pin 15 interacts with the longitudinal slots 10 for acting as a stop for limiting the travel of the sleeve 12. Accordingly, the smooth top 14 is aligned with the top of the cap 3 when the support tube 50 is not in place.

The use of the support frame 1 will be described hereinafter. The support tube 50 is pressed against the smooth top 14 and is used to compress the spring 8. The actuator button 52 is depressed so as to allow the locking button 51 to enter the sleeve 2. The support tube 50 is inserted into the support frame 1 until the locking button 51 engages one of the openings 7. The support tube 50 is then securely fixed in the support frame 1 and the smooth top 14 of the filler sleeve 12 applies pressure to the bottom of the support tube 50 to prevent vibrations and or rattling of the support tube 50.

The support tube 50 is removed by simply depressing the actuator button 52. This allows the locking button 51 to disengage from the opening 7. The support tube 50 is then pulled out of the sleeve 2 and the smooth top 14 moves up until the filler sleeve 12 reaches the end of travel and the smooth top 14 is flush with the top of the cap 3.

We claim:

1. A support frame for mounting to a surface and for receiving a support tube having a locking button, the support frame comprising:
    a cap for affixing the support frame to the surface;
    a sleeve attached to said cap for receiving the support tube and for engaging the locking button;
    a filler sleeve disposed in said sleeve, said filler sleeve having an outwardly facing top surface configured for abutting an end of the support tube;
    a spring disposed in said sleeve for biasing said filler sleeve against the support tube; and
    said filler sleeve having a stop for limiting the travel of said filler sleeve and, for retaining said filler sleeve in said sleeve.

2. The support frame according to claim 1, wherein said stop is configured as a plug connected to said filler sleeve with a pin, said pin engaging said sleeve.

3. The support frame according to claim 2, wherein said sleeve has longitudinal slots for engaging said pin.

4. The support frame according to claim 3, wherein said filler sleeve has a top surface and said cap has a top surface, said longitudinal slots and said pin are configured to limit travel of said filler sleeve such that said top surfaces are flush with one another.

5. The support frame according to claim 1, wherein said cap includes a tube portion which overlaps said sleeve for attaching said sleeve to said cap.

6. The support frame according to claim 5, wherein said tube portion has at least one opening formed therein for engaging the locking button.

7. The support frame according to claim 1, wherein said cap has holes formed therein for mounting the support frame to the surface.

8. The support frame according to claim 1, wherein said cap has a top surface, said stop being configured to limit the travel of said filler sleeve to a position where said outwardly facing top surface and said top surface of said cap are substantially flush with one another.

9. A support assembly for supporting a bimini top on a marine vessel, the assembly comprising:
    a support tube having a locking button and an actuator button for actuating said locking button;
    support frame mounting to a surface of the vessel, said support frame comprising;
    a cap for affixing the support frame to the surface;
    said support frame having a sleeve attached to said cap for receiving the support tube and for engaging the locking button and for receiving said support tube; and
    a biased filler sleeve disposed in said sleeve for abutting said support tube said filler sleeve being retained in said sleeve.

10. The assembly according to claim 9, wherein said biased filler sleeve is biased against said support tube by a spring.

11. The assembly according to claim 10, wherein said biased filler sleeve has a stop for limiting the travel of said biased filler sleeve and for retaining said biased filler sleeve in said sleeve.

12. The assembly according to claim 11, wherein said sleeve has openings formed therein for engaging said locking pin.

13. A support frame for mounting to a surface and for receiving a support tube having a locking button, the support frame comprising:

a cap for affixing the support frame to the surface;
a sleeve attached to said cap for receiving the support tube and for engaging the locking button;
a filler sleeve disposed in said sleeve for abutting an end of the support tube;
a spring disposed in said sleeve for biasing said filler sleeve against the support tube; and
said filler sleeve having a stop for limiting the travel of said filler sleeve and for retaining said filler sleeve in said sleeve, said stop being configured as a plug connected to said filler sleeve with a pin, said pin engaging said sleeve.

* * * * *